US006981054B1

(12) United States Patent
Krishna

(10) Patent No.: US 6,981,054 B1
(45) Date of Patent: Dec. 27, 2005

(54) FLOW CONTROL ARRANGEMENT IN A NETWORK SWITCH BASED ON PRIORITY TRAFFIC

(75) Inventor: Gopal S. Krishna, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 761 days.

(21) Appl. No.: 09/618,291

(22) Filed: Jul. 18, 2000

Related U.S. Application Data

(60) Provisional application No. 60/209,582, filed on Jun. 6, 2000.

(51) Int. Cl.$^7$ ............................ G06F 15/16; G06F 3/00; H04L 12/26; H04L 12/28
(52) U.S. Cl. ........................ 709/235; 710/29; 370/414; 370/236
(58) Field of Search ............................. 709/235, 234; 710/29; 370/231, 235–236, 236.1, 236.2, 370/412–418

(56) References Cited

U.S. PATENT DOCUMENTS

| | | | |
|---|---|---|---|
| 5,179,556 A * | 1/1993 | Turner | 370/233 |
| 5,673,254 A | 9/1997 | Crayford | |
| 5,859,837 A | 1/1999 | Crayford | |
| 5,905,870 A | 5/1999 | Mangin et al. | |
| 5,953,335 A | 9/1999 | Erimli et al. | |
| 6,084,856 A | 7/2000 | Simmons et al. | |
| 6,157,623 A * | 12/2000 | Kerstein | 370/315 |
| 6,421,348 B1 * | 7/2002 | Gaudet et al. | 370/401 |
| 6,563,818 B1 * | 5/2003 | Sang et al. | 370/379 |
| 6,680,906 B1 * | 1/2004 | Nguyen | 370/229 |
| 6,724,725 B1 * | 4/2004 | Dreyer et al. | 370/231 |
| 2002/0012342 A1 * | 1/2002 | Oldfield et al. | 370/386 |
| 2003/0133406 A1 * | 7/2003 | Fawaz et al. | 370/229 |

OTHER PUBLICATIONS

Elbert, S. et al., Gigabit Ethernet and Low-Cost Supercomputing, www.scl.ameslab.gov/Publications/Gigabit/tr5126.html, Ame Lab. Tech. Report IS-5126, pp. 1-15, Nov. 1997.*
Kim, D., End-to-End Ethernet, ccl.chungnam.ac.kr/archive/ProfAchive/Presentations/EndtoEndEthernet_HSN2000.pdf, pp. 1-32, Feb. 24, 2000.*
Digital GIGASwitch/Ethernet System: Installation and Operation Guide, Part No. EK-DGBGA-IN. A01, Digital Equipment Corp. pp. iii to viii and 5-1 to 5-8, 1998.*
SmartSwitch 2000 User's Guide, Cabletron Systems, pp. 2-1 to 2-76, 1999.*

(Continued)

*Primary Examiner*—Larry D. Donaghue
(74) *Attorney, Agent, or Firm*—Manelli Denison & Selter PLLC; Leon R. Turkevich

(57) ABSTRACT

A network switch includes network switch ports, each including a port filter configured for detecting user-selected attributes from a received layer 2 frame. Each port filter, upon detecting a user-selected attribute in a received layer 2 frame, sends a signal to a switching module indicating the determined presence of the user-selected attribute, for example whether the data packet has a prescribed priority value. The network switch includes a flow control module that determines which of the network switch ports should output a flow control frame based on the determined depletion of network switch resources and based on the corresponding priority value of the network traffic on each network switch port. Hence, any network switch port that receives high priority traffic does not output a flow control frame to the corresponding network station, enabling that network station to continue transmission of the high priority traffic. In most cases, the congestion and depletion of network switch resources can be alleviated by sending flow control frames on only those network switch ports that receive lower priority traffic, enabling the network switch to reduce congestion without interfering with high priority traffic.

15 Claims, 3 Drawing Sheets

OTHER PUBLICATIONS

Karol, M., et al., Prevention of Deadlocks and Livelocks in Lossless, Backpressured Packet Networks, Proceeding of INFOCOM 2000, pp. 1333-1342, pp. 1-10 as printed, Mar. 26-30, 2000.*

Seifert, R., www.ieee802.org/1/files/public/docs96/d95n157.txt, p. 1, Jun. 1996.*

Hendel, A., www.ieee802.org/1/files/public/docs96/d96n158.txt, pp. 1-2, Jun. 1996.*

* cited by examiner

FLOW CONTROL ARRANGEMENT IN A NETWORK SWITCH BASED ON PRIORITY TRAFFIC

This application claims priority from Provisional Application No. 60/209,582, filed Jun. 6, 2000.

BACKGROUND OF THE INVENTION

1. Field of the Invention

The present invention relates to layer 2 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1d protocol that enables the network switch to perform more advanced switching operations. For example, the VLAN tag may specify another subnetwork (via a router) or a prescribed group of stations.

Flow control has been proposed to reduce network congestion in a network switch, where a sending station temporarily suspends transmission of data packets. For example, commonly-assigned, U.S. Pat. Nos. 5,673,254, 5,859,837 and 5,905,870 disclose arrangements for initiating and maintaining flow control in shared-medium, full-duplex, and switched IEEE 802.3 networks by generation of a PAUSE frame in a full-duplex network, or backpressure in a half duplex network. Hence, typical layer 2 flow control involves a layer 2 switch outputting pause commands to all devices connected to the network switch ports when internal switch resources are close to being exhausted.

Efforts to enhance the switching performance of a network switch to include layer 3 (e.g., Internet protocol) processing may suffer serious drawbacks. In particular, the generation of pause frames on all network switch ports adversely affects attempts to maintain advanced switching operations, for example maintaining high priority traffic. Hence, the generation of pause frames may interfere with network nodes attempting to transmit high priority traffic, resulting in a conflict between the necessity for congestion control and the necessity for maintaining reliable transport for high priority traffic.

SUMMARY OF THE INVENTION

There is a need for an arrangement that enables a network switch to perform priority based switching of data packets without congestion of the network switch resources.

There is also a need for an arrangement in a network switch that enables the network switch to avoid congestion by outputting flow control frames without interfering with the switching of high priority traffic.

These and other needs are attained by the present invention, where a network switch outputs flow control frames on selected network switch ports based on a determined priority of network traffic on the selected network switch ports.

One aspect of the present invention provides a method in a network switch, the method comprising first determining a priority for a data frame received on a network switch port, second determining a depletion of network switch resources, and selectively outputting a flow control frame on the network switch port based on the determined depletion of network switch resources relative to the determined priority. The determination of a priority for the data frame enables the network switch to provide advanced switching operations for the data frame, ensuring that quality of service may be provided for the received data packet. Moreover, the selective output of a flow control frame based on the determined depletion of network switch resources relative to the determined priority ensures that flow control frames are not output on network switch ports receiving high priority data frames, or at least until the network switch resources reach a substantially depleted condition. Hence, the network switch can maintain the reliability of traffic prioritization and quality of service while managing network switch resources.

Another aspect of the present invention provides an integrated network switch that includes a plurality of network switch ports, each configured for receiving a data packet and selectively outputting a flow control frame in response to a flow control output signal. The switch also includes a flow control module configured for determining a depletion of network switch resources, the flow control module configured for storing, for each of the network switch ports, a corresponding determined priority value based on the corresponding received data packet, the flow control module selectively outputting the flow control output signal to selected ones of the network switch ports based on the determined depletion of network switch resources relative to the respective determined priority values. The selection of the network switch ports to receive the flow control output signal enables the network switch to selectively output flow control frames, on a per port basis, based on the corresponding priority of the network switch port traffic, and based on the determined depletion of network switch resources. Hence, the network switch can output flow control frames on network switch ports receiving low priority traffic to relieve congestion, while maintaining the high priority traffic on selected network switch ports.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
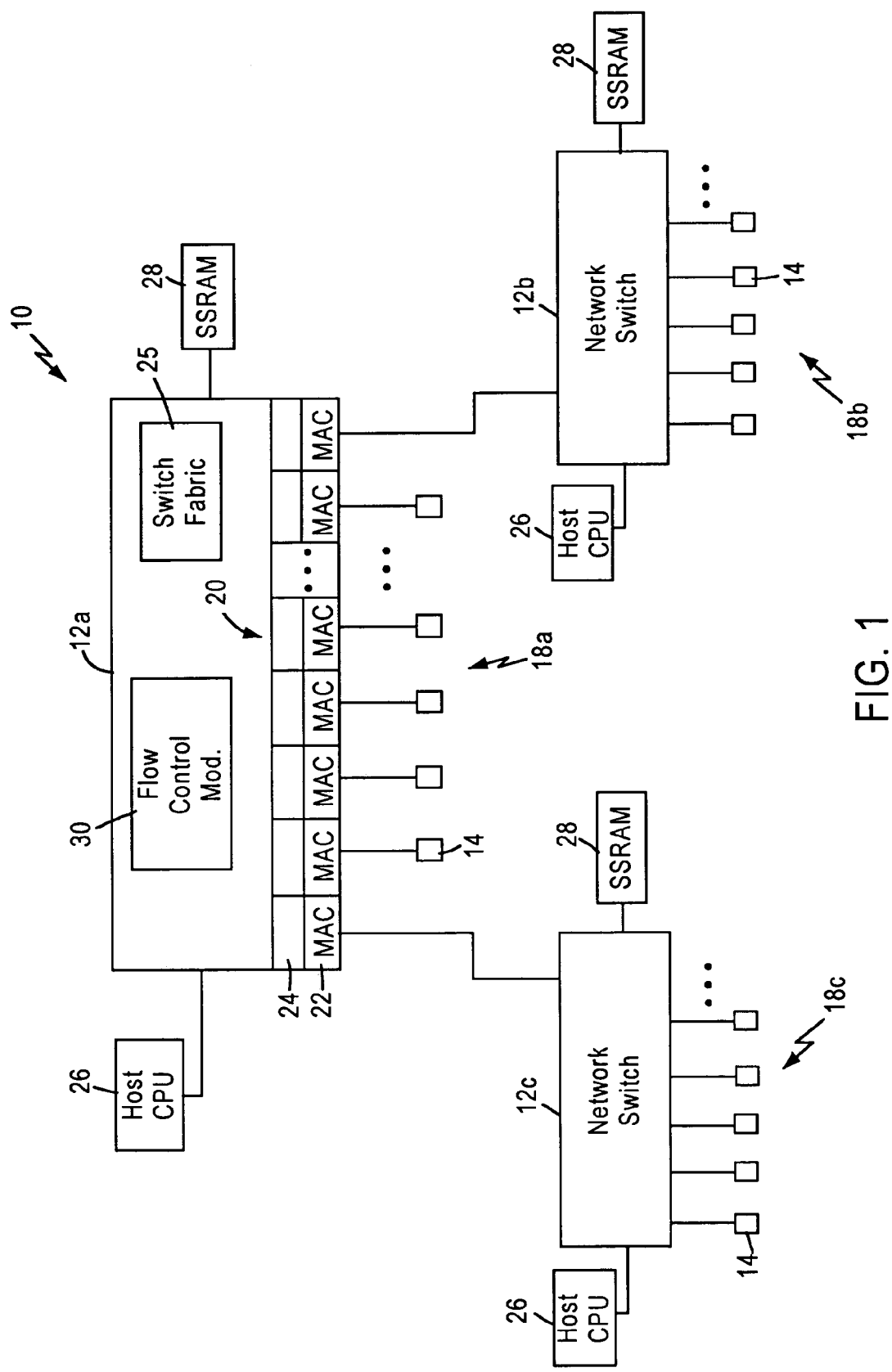
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 is interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol, and port filters 24. Each port filter 24 is configured for identifying a user-selected attribute of the data frame, for example a priority of the data packet, and outputting the relevant switching information (e.g., whether the user-selected attribute was detected) to a switch fabric 25. The switch fabric 25 is configured for making frame forwarding decisions for received data packets. In particular, the switch fabric 25 is configured for layer 2 switching decisions based on MAC source address, MAC destination address, and VLAN information within the Ethernet (IEEE 802.3) header; the switch fabric 25 is also configured for implementation of user-defined switching policies based on detection of the user-selected attributes within the Ethernet packet, described in detail below.

As shown in FIG. 1, each switch 12 has an associated host CPU 26 and a buffer memory 28, for example an SSRAM. The host CPU 26 controls the overall operations of the corresponding switch 12, including programming of the port filters 24 and the switch fabric 25. The buffer memory 28 is used by the corresponding switch 12 to store data frames while the switch fabric 25 is processing forwarding decisions for the received data packets.

The switch fabric 25 is configured for performing layer 2 switching decisions and switching decisions that implement user-defined switching policies; such user-defined switching policies may include granting sufficient switch resources to ensure a guaranteed quality of service (e.g., reserved bandwidth or guaranteed latency) for a received data packet having a prescribed user-selected attribute, for example having been received on a selected ingress port, having a prescribed MAC or IP source or destination address, or having been determined to belong to a prescribed flow, for example an IGMP media flow, or having a determined priority. The availability of switching decisions that implement user-defined switching policies including layer 3 switching decisions and above, also referred to herein as policy-based switching decisions, enables the switch fabric 25 to make intelligent decisions as far as how to handle a packet, including advanced forwarding decisions, and whether a packet should be considered a high-priority packet for latency-sensitive applications, such as video or voice.

Instances may arise where the network traffic flowing through the network switch 12 may begin to create a substantial depletion of network switch resources such as buffer capacity, creating congestion in the network switch. If flow control frames, for example backpressure in a half-duplex network or pause frames in a full duplex network, were transmitted from all the network switch ports 20 to the network stations 14 according to IEEE 802.3 protocol, the flow control frames may interfere with the policy-based switching decisions for high-priority network traffic. Such interference with high priority traffic is undesirable especially if the congestion can be alleviated merely by temporarily suspending the low priority traffic.

According to the disclosed embodiment, the network switch 12 includes a flow control module 30 that determines which of the network switch ports 20 should output a flow control frame based on the determined depletion of network switch resources and based on the corresponding priority value of the network traffic on each network switch port. Hence, any network switch port 20 that receives high priority traffic does not output a pause frame to the corresponding network station 14, enabling that network station 14 to continue transmission of the high priority traffic. In most cases, the congestion and depletion of network switch resources can be alleviated by sending flow control frames on only those network switch ports that receive lower priority traffic, enabling the network switch 12 to reduce congestion without interfering with high priority traffic.

As described below, the determination of whether a data packet is designated as high priority traffic is programmable by a user. Although the determination of a priority for the data frame received on a given network switch port 24 could be determined centrally by the flow module 30, the disclosed embodiment performs distributed packet classification in each of the network switch ports 20. In particular, each port filter 24 of FIG. 1 is configured for identifying user-selected attributes from a received layer 2 frame. The port filter 24 can be implemented as a state machine that monitors the bytes coming in from the network, hence the state machine can analyze the data frame for the presence of prescribed user-selected attributes (such as the priority of a packet) on a per-byte basis as the bytes of packet data of the data frame are received by the network switch port. In addition, the port filter 24 can be configured for multiple simultaneous comparisons of the incoming packet data with multiple templates that specify respective user-selected attributes, enabling the port filter 24 to simultaneously determine the presence of a plurality of user-selected attributes as the data frame is received.

Figure 2:
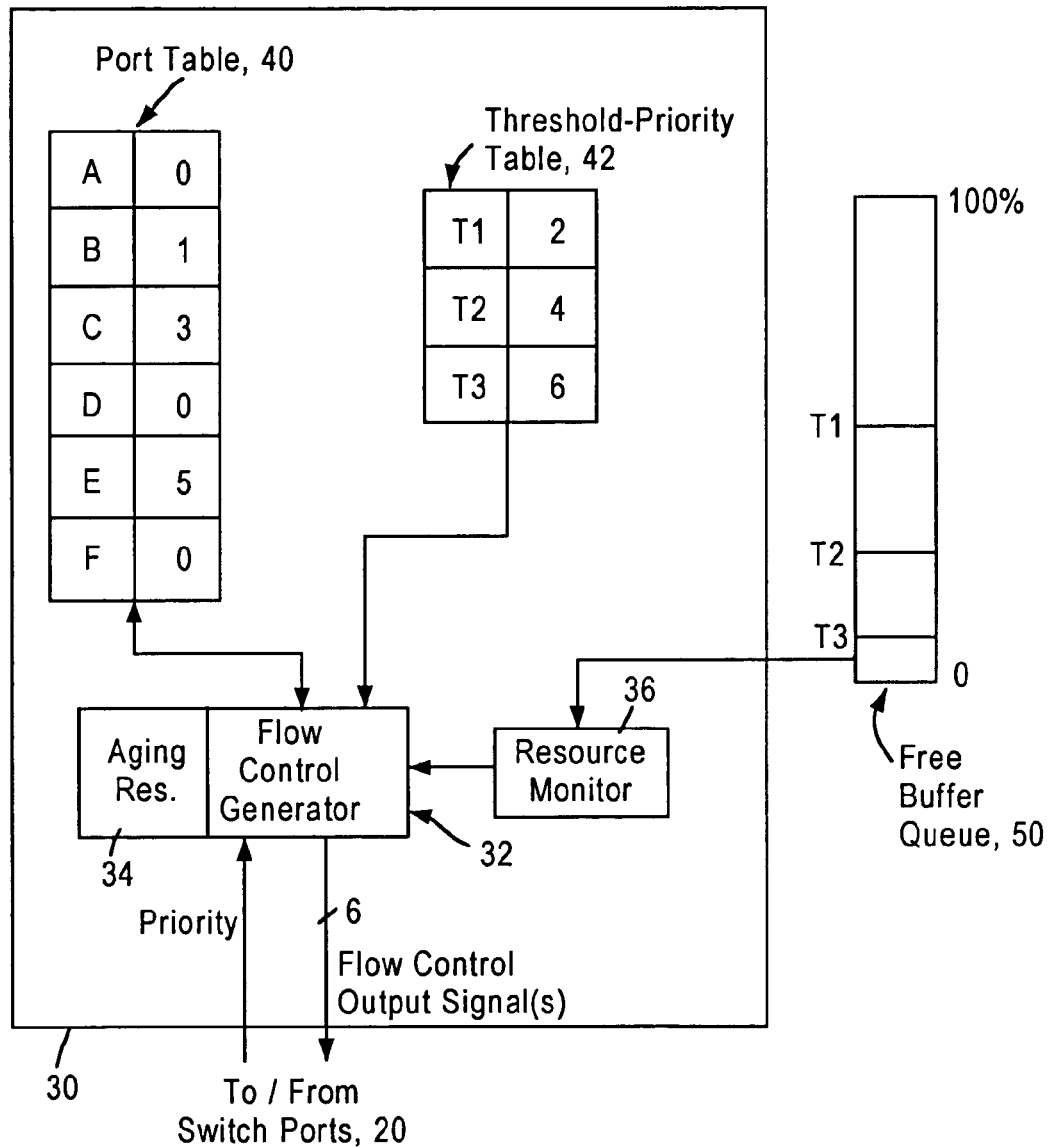
FIG. 2 is a diagram illustrating in further detail the flow control module of FIG. 1.
Figure 3:
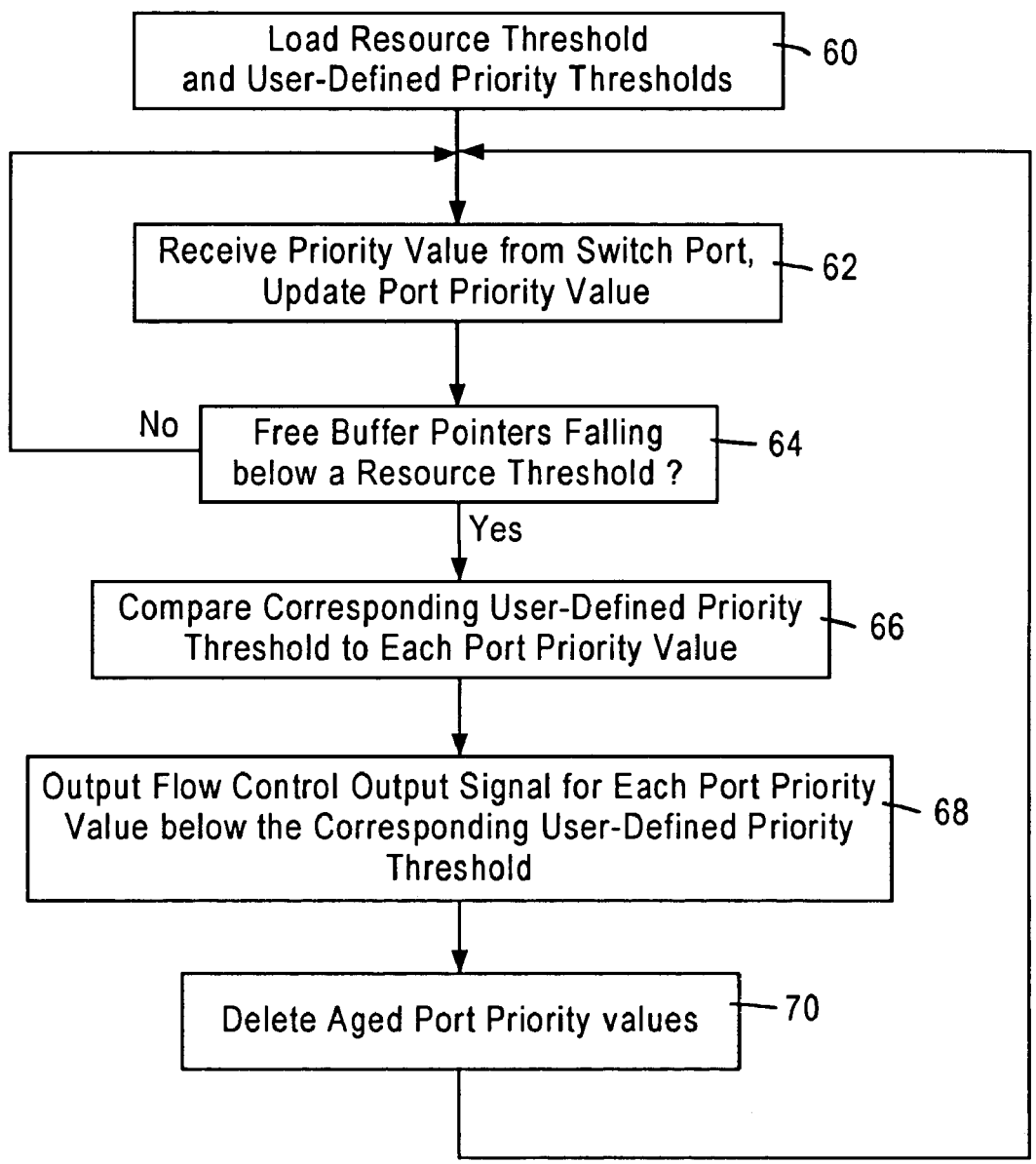
FIG. 3 is a diagram illustrating the method of outputting flow control frames on selected network switch ports according to an embodiment of the present invention.

FIG. 2 is a diagram illustrating in further detail the flow control module 30 according to an embodiment of the present invention. FIG. 3 is a diagram illustrating the method of selectively outputting flow control frames on selected network switch ports according to an embodiment of the present invention. The flow control module 30 includes a flow control generator 32 having an aging resource 34, a resource monitor 36, a port table 40, and a threshold-priority table 42. The port table 40 is configured for storing the determined priority values for the respective network switch ports 20, received by the flow control generator 32 from the network switch ports 20. For example, assume the network switch 12 includes network switch ports designated A, B, C, D, E, and F; the flow control generator 32, in response to receiving the port priority values from the respective switch ports 20, stores the port priority values in the port table 40. According to the example illustrated in FIG. 2, the network switch ports A, D and F have zero priority traffic, network switch port B has level 1 priority traffic, network switch port C has level 3 priority traffic, and network switch port E has level 5 priority traffic.

The flow control generator 32 is configured for selectively outputting flow control output signals to selected network switch ports based on the determined depletion of network switch resources relative to the respective determined priority values. For example, the resource monitor 36 is configured for monitoring a free buffer queue 50, within the network switch 12, that stores unused frame pointers that specify a corresponding buffer memory location in the memory 28 available for storage of frame data. Hence, if there is no frame data stored in the memory 28, then the free buffer queue is filled at 100 percent; conversely, congestion and depletion of network switch resources (e.g., available buffer storage in the buffer memory 28) begin to occur as the number of frame pointers in the free buffer queue 50 approaches zero.

The threshold priority table 42, programmed by a user of the host CPU 26 in step 60, is configured for storing prescribed resource threshold values (e.g., T1, T2, and T3) and respective user-defined priority thresholds (e.g., "2", "4" and "6") that specify the minimum port priority value necessary to avoid generation of a flow control frame on the corresponding network switch port 20. After the threshold priority table 42 has been programmed by the user, the network switch 12 can begin switching operations.

As described above, each of the network switch ports 20 includes a port filter 24 configured for determining a priority for a data frame received on the corresponding network switch port. Each port filter 24, upon determining the priority for the data frame, forwards the determined port priority value to the flow control generator 32 for storage in the port table 40 in step 62.

The resource monitor 36 supplies to the flow control generator 32 the number of frame pointers in the free buffer queue 50, indicating the availability of network switch resources. The flow control generator 32, upon determining the number of free buffer pointers in the free buffer queue 50, determines in step 64 whether there is a depletion of network switch resources based on the resource thresholds T1, T2, and T3 stored in the threshold priority table 42; if a depletion of network switch resources is detected, the flow control generator 32 compares each of the port priority values stored in the port table 40 in step 66 with the corresponding user-defined priority threshold in the threshold priority table 42 to determine whether a flow control output signals should be output. For example, if the flow control generator 32 determines that the number of frame pointers in the free buffer queue 50 falls below the threshold T1, T2, or T3, the flow control generator 32 determines which network switch ports 20 have a port priority value less than "2", "4", or "6", respectively. Assuming that the network switch resources fell below the threshold T2, the flow control generator 32 would output a flow control output signal in step 68 to the network switch ports A, B, C, D, and F, causing those network switch ports to output flow control frames (e.g., backpressure or pause frames); however the network switch port E, having a port priority value greater than the user-defined priority threshold value of "4", does not receive the flow control output signal, hence can continue to receive the level 5 high-priority traffic.

The flow control generator 32 also includes an aging resource 34, enabling the flow control generator 32 to delete aged port priority values in step 70.

According to the disclosed embodiment, a flow control module selectively determines whether a network switch port should output a flow control frame based on the determined depletion of network switch resources relative to a determined priority of data traffic received by the network switch port. Hence, high-priority traffic can be maintained to satisfy quality of service requirements, while reducing congestion by temporarily suspending lower priority traffic.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch having a plurality of network switch ports, the method comprising:

first determining a priority for each data frame received on a corresponding network switch port, each network switch port including a port filter configured for determining the corresponding priority for the corresponding received data frame, the first determining including determining, by the corresponding port filter of the corresponding network switch port having received the data frame, the corresponding priority for the corresponding data frame;

second determining a depletion of network switch resources; and selectively outputting a flow control frame on the network switch port based on the determined depletion of network switch resources relative to the determined priority.

2. The method of claim 1, further comprising storing the determined priority within a table configured for storing the determined priority for each of a plurality of the network switch ports.

3. The method of claim 2, wherein the second determining step includes determining whether an availability of the network switch resources falls below a first prescribed threshold value.

4. The method of claim 3, further comprising setting the first prescribed threshold value based on a user-defined priority threshold.

5. The method of claim 4, wherein the setting step includes setting a plurality of prescribed threshold values, including the first prescribed threshold value, based on a plurality of the user-defined priority threshold, respectively.

6. The method of claim 5, wherein:

the first determining step includes determining the priority from a plurality of available priority values;

the second determining step includes determining whether the availability of the network resources has fallen below an identified one of the prescribed threshold values; and the selectively outputting step includes identifying from the table the network switch ports having respective priority values less than the corresponding user-defined priority threshold for the identified one prescribed threshold value.

7. The method of claim 5, wherein the step of setting the plurality of prescribed threshold values includes storing the prescribed threshold values and the respective user-defined priority thresholds in a second table.

8. The method of claim 2, further comprising deleting the determined priority from the table after a prescribed aging interval.

9. The method of claim 3, further comprising setting a plurality of prescribed threshold values based on a plurality of respective user-defined priority thresholds.

10. The method of claim 9, wherein:
the first determining step includes determining the priority from a plurality of available priority values;
the second determining step includes determining whether the availability of the network resources has fallen below an identified one of the prescribed threshold values; and
the selectively outputting step includes identifying from the table the network switch ports having respective priority values less than the corresponding user-defined priority threshold for the identified one prescribed threshold value.

11. An integrated network switch comprising:
a plurality of network switch ports, each configured for receiving a data packet and selectively outputting a flow control frame in response to a flow control output signal, each network switch port including a port filter configured for determining a corresponding determined priority value for the corresponding received data packet; and
a flow control module configured for determining a depletion of network switch resources, the flow control module configured for storing, for each of the network switch ports, the corresponding determined priority value based on the corresponding received data packet, the flow control module selectively outputting the flow control output signal to selected ones of the network switch ports based on the determined depletion of network switch resources relative to the respective determined priority values.

12. The switch of claim 11, wherein the flow control module includes a first table configured for storing the determined priority values for the respective network switch ports, and a second table configured for storing a plurality of prescribed resource threshold values and respective user-defined priority thresholds, the flow control module configured for determining whether the availability of the network resources has fallen below an identified one of the prescribed resource threshold values.

13. The switch of claim 12, wherein the flow control module is configured for selecting the selected ones of the network switch ports based on the respective determined priority values being less than the corresponding user-defined priority threshold for the identified one prescribed resource threshold value.

14. The switch of claim 12, further comprising a free buffer queue configured for storing unused frame pointers, each unused frame pointer specifying a corresponding buffer memory location available for storage of frame data, the flow control module configured for determining the depletion of network switch resources based on a comparison between a number of the unused frame pointers in the free buffer queue relative to the prescribed resource threshold values.

15. The switch of claim 11, wherein the flow control module deletes the determined priority value for a selected one of the network switch ports after a prescribed aging interval.

* * * * *